(12) United States Patent
Tan (10) Patent No.: US 11,960,061 B2
(45) Date of Patent: Apr. 16, 2024

(54) CAMERA OPTICAL LENS

(71) Applicant: AAC Optics (Suzhou) Co., Ltd., Suzhou (CN)

(72) Inventor: Mengke Tan, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 705 days.

(21) Appl. No.: 17/138,899

(22) Filed: Dec. 31, 2020

(65) Prior Publication Data

US 2022/0196976 A1    Jun. 23, 2022

(30) Foreign Application Priority Data

Dec. 21, 2020 (CN) .......................... 202011513580.6

(51) Int. Cl.
*G02B 9/62* (2006.01)
*G02B 13/00* (2006.01)

(52) U.S. Cl.
CPC ........... *G02B 13/0045* (2013.01); *G02B 9/62* (2013.01)

(58) Field of Classification Search
CPC .. G02B 13/0045; G02B 9/62; G02B 13/0015; G02B 13/18; G02B 13/002
See application file for complete search history.

(56) References Cited

U.S. PATENT DOCUMENTS

| 2019/0227276 | A1* | 7/2019 | Sato | G02B 13/0045 |
| 2020/0241243 | A1* | 7/2020 | Hirano | G02B 9/64 |
| 2020/0264411 | A1* | 8/2020 | Huang | G02B 13/02 |
| 2020/0333567 | A1* | 10/2020 | Tang | G02B 9/62 |

FOREIGN PATENT DOCUMENTS

JP    1999119098 A1 *  4/1999

OTHER PUBLICATIONS

1st Office Action dated Jun. 29, 2021 by JPO in related Japanese Patent Application No. 2020-219919 (11 Pages).
1st Office Action dated Feb. 1, 2021 by SIPO in related Chinese Patent Application No. 202011513580.6 (8 Pages).

* cited by examiner

*Primary Examiner* — Thomas K Pham
*Assistant Examiner* — Jennifer A Jones
(74) *Attorney, Agent, or Firm* — W&G Law Group (57) ABSTRACT

A camera optical lens includes six-piece lenses, from an object side to an image side, the six-piece lenses are: a first lens having a positive refractive power, a second lens having a negative refractive power, a third lens having a negative refractive power, a fourth lens, a fifth lens having a positive refractive power and a sixth lens having a negative refractive power. The camera optical lens satisfies conditions of $0.35 \le f1/f \le 0.50$, $-30.00 \le R4/R3 \le -2.00$, and $1.50 \le (R5+R6)/(R5-R6) \le 30.00$. The camera optical lens of the present application has excellent optical performances, and meanwhile can meet design requirements of a long focal length and is ultra-thin.

16 Claims, 9 Drawing Sheets

CAMERA OPTICAL LENS

TECHNICAL FIELD

The present application relates to the field of optical lens, in particular, to a camera optical lens suitable for handheld devices, such as smart phones and digital cameras, and imaging devices, such as monitors or PC lenses.

BACKGROUND

With the emergence of smart phones in recent years, the demand for miniature camera lenses is increasing day by day, and as the pixel size of the photosensitive devices become smaller; plus, with the current development trend of electronic products towards better functions and thinner and smaller dimensions, miniature camera lenses with good imaging quality have become a mainstream in the market. In order to obtain better imaging quality, a multi-piece lens structure is often adopted. Also, with the development of technology and the increase of the diverse demands of users, and as the pixel area of photosensitive devices is becoming smaller and smaller and the requirement of a system on the imaging quality is improving constantly, a six-piece structure gradually appears in lens designs. Therefore, there is an urgent need for a camera optical lens having a long focal length with excellent optical performance, small size and fully corrected aberrations.

SUMMARY

In viewing of above problems, an objective of the present application is to provide a camera optical lens, which has excellent optical performances, and meanwhile can meet design requirements of a long focal length and is ultra-thin.

To solve the above problems, some embodiments of the present application are to provides a camera optical lens including six-piece lenses, from an object side to an image side, the six-piece lenses are: a first lens having a positive refractive power, a second lens having a negative refractive power, a third lens having a negative refractive power, a fourth lens, a fifth lens having a positive refractive power and a sixth lens having a negative refractive power. The camera optical lens satisfies conditions of $0.35 \leq f1/f \leq 0.50$, $-30.00 \leq R4/R3 \leq -2.00$, and $1.50 \leq (R5+R6)/(R5-R6) \leq 30.00$. Here f denotes a focal length of the camera optical lens, f1 denotes a focal length of the first lens, R3 denotes a curvature radius of an object-side surface of the second lens, R4 denotes a curvature radius of an image-side surface of the second lens, R5 denotes a curvature radius of an object-side surface of the third lens, and R6 denotes a curvature radius of an image-side surface of the third lens.

Preferably, the camera optical lens further satisfies a condition of $1.50 \leq f5/f \leq 10.00$, here f5 denotes a focal length of the fifth lens.

Preferably, an object-side surface of the first lens is convex in a paraxial region, an image-side surface of the first lens is convex in the paraxial region; and the camera optical lens further satisfies conditions of $-1.45 \leq (R1+R2)/(R1-R2) \leq -0.27$, and $0.06 \leq d1/TTL \leq 0.25$. Here R1 denotes a curvature radius of the object-side surface of the first lens, R2 denotes a curvature radius of the image-side surface of the first lens, d1 denotes an on-axis thickness of the first lens, and TTL denotes a total optical length from the object-side surface of the first lens to an image surface of the camera optical lens along an optical axis.

Preferably, the camera optical lens further satisfies conditions of $-0.91 \leq (R1+R2)/(R1-R2) \leq -0.34$, and $0.10 \leq d1/TTL \leq 0.20$.

Preferably, the object-side surface of the second lens is concave in the paraxial region, the image-side surface of the second lens is concave in the paraxial region; and the camera optical lens further satisfies conditions of $-1.32 \leq f2/f \leq -0.40$, $-1.87 \leq (R3+R4)/(R3-R4) \leq -0.23$, and $0.02 \leq d3/TTL \leq 0.07$. Here f2 denotes a focal length of the second lens, and d3 denotes an on-axis thickness of the second lens.

Preferably, the camera optical lens further satisfies conditions of $-0.83 \leq f2/f \leq -0.50$, $-1.17 \leq (R3+R4)/(R3-R4) \leq -0.29$, and $0.02 \leq d3/TTL \leq 0.06$.

Preferably, the object-side surface of the third lens is convex in the paraxial region, the image-side surface of the third lens is concave in the paraxial region; and the camera optical lens further satisfies conditions of $-34.70 \leq f3/f \leq -0.49$, and $0.01 \leq d5/TTL \leq 0.04$. Here f3 denotes a focal length of the third lens, and d5 denotes an on-axis thickness of the third lens.

Preferably, the camera optical lens further satisfies conditions of $-21.69 \leq f3/f \leq -0.62$, and $0.02 \leq d5/TTL \leq 0.03$.

Preferably, an object-side surface of the fourth lens is concave in the paraxial region, an image-side surface of the fourth lens is convex in the paraxial region; and the camera optical lens further satisfies conditions of $-28.03 \leq f4/f \leq 3.04$, $-50.54 \leq (R7+R8)/(R7-R8) \leq 6.91$, and $0.01 \leq d7/TTL \leq 0.05$. Here f4 denotes a focal length of the fourth lens, R7 denotes a curvature radius of the object-side surface of the fourth lens, R8 denotes a curvature radius of the image-side surface of the fourth lens, and d7 denotes an on-axis thickness of the fourth lens.

Preferably, the camera optical lens further satisfies conditions of $-17.52 \leq f4/f \leq 2.43$, $-31.59 \leq (R7+R8)/(R7-R8) \leq 5.53$, and $0.02 \leq d7/TTL \leq 0.04$.

Preferably, an object-side surface of the fifth lens is concave in the paraxial region, an image-side surface of the fifth lens is convex in the paraxial region; and the camera optical lens further satisfies conditions of $1.29 \leq (R9+R10)/(R9-R10) \leq 10.25$, and $0.03 \leq d9/TTL \leq 0.16$. Here R9 denotes a curvature radius of the object-side surface of the fifth lens, R10 denotes a curvature radius of the image-side surface of the fifth lens, and d9 denotes an on-axis thickness of the fifth lens.

Preferably, the camera optical lens further satisfies conditions of $2.06 \leq (R9+R10)/(R9-R10) \leq 8.20$, and $0.05 \leq d9/TTL \leq 0.13$.

Preferably, an object-side surface of the sixth lens is concave in a paraxial region; and the camera optical lens further satisfies conditions of $-4.21 \leq f6/f \leq -0.53$, $-3.62 \leq (R11+R12)/(R11-R12) \leq -0.36$, and $0.02 \leq d11/TTL \leq 0.48$. Here f6 denotes a focal length of the sixth lens, R11 denotes a curvature radius of the object-side surface of the sixth lens, R12 denotes a curvature radius of an image-side surface of the sixth lens, and d11 denotes an on-axis thickness of the sixth lens.

Preferably, the camera optical lens further satisfies conditions of $-2.63 \leq f6/f \leq -0.66$, $-2.26 \leq (R11+R12)/(R11-R12) \leq -0.45$, and $0.03 \leq d11/TTL \leq 0.38$.

Preferably, the camera optical lens further satisfies a condition of $0.29 \leq f12/f \leq 1.46$, here f12 denotes a combined focal length of the first lens and the second lens.

Preferably, the camera optical lens further satisfies a condition of $FNO \leq 2.52$, here FNO denotes an F number of the camera optical lens.

Preferably, the camera optical lens further satisfies a condition of f/IH≥2.70, here IH denotes an image height of the camera optical lens.

Preferably, the camera optical lens further satisfies a condition of TTL/IH≤3.15.

Advantageous effects of the present application are that the camera optical lens has excellent optical performances, a long focal length, and is ultra-thin. The camera optical lens is especially suitable for mobile camera lens components and WEB camera lens composed of high pixel CCD, CMOS.

BRIEF DESCRIPTION OF DRAWINGS

In order to more clearly illustrate the technical solutions in the embodiments of the present disclosure, the following will briefly describe the accompanying drawings used in the description of the embodiments. Obviously, the accompanying drawings in the following description are only some embodiments of the present disclosure. For a person of ordinary skill in the art, other drawings may be obtained from these drawings without creative work.

DETAILED DESCRIPTION OF EMBODIMENTS

To make the objectives, technical solutions, and advantages of the present disclosure clearer, embodiments of the present disclosure are described in detail with reference to accompanying drawings in the following. A person of ordinary skill in the art should understand that, in the embodiments of the present disclosure, many technical details are provided to make readers better understand the present disclosure. However, even without these technical details and any changes and modifications based on the following embodiments, technical solutions required to be protected by the present disclosure may be implemented.

Embodiment 1

Figure 1:
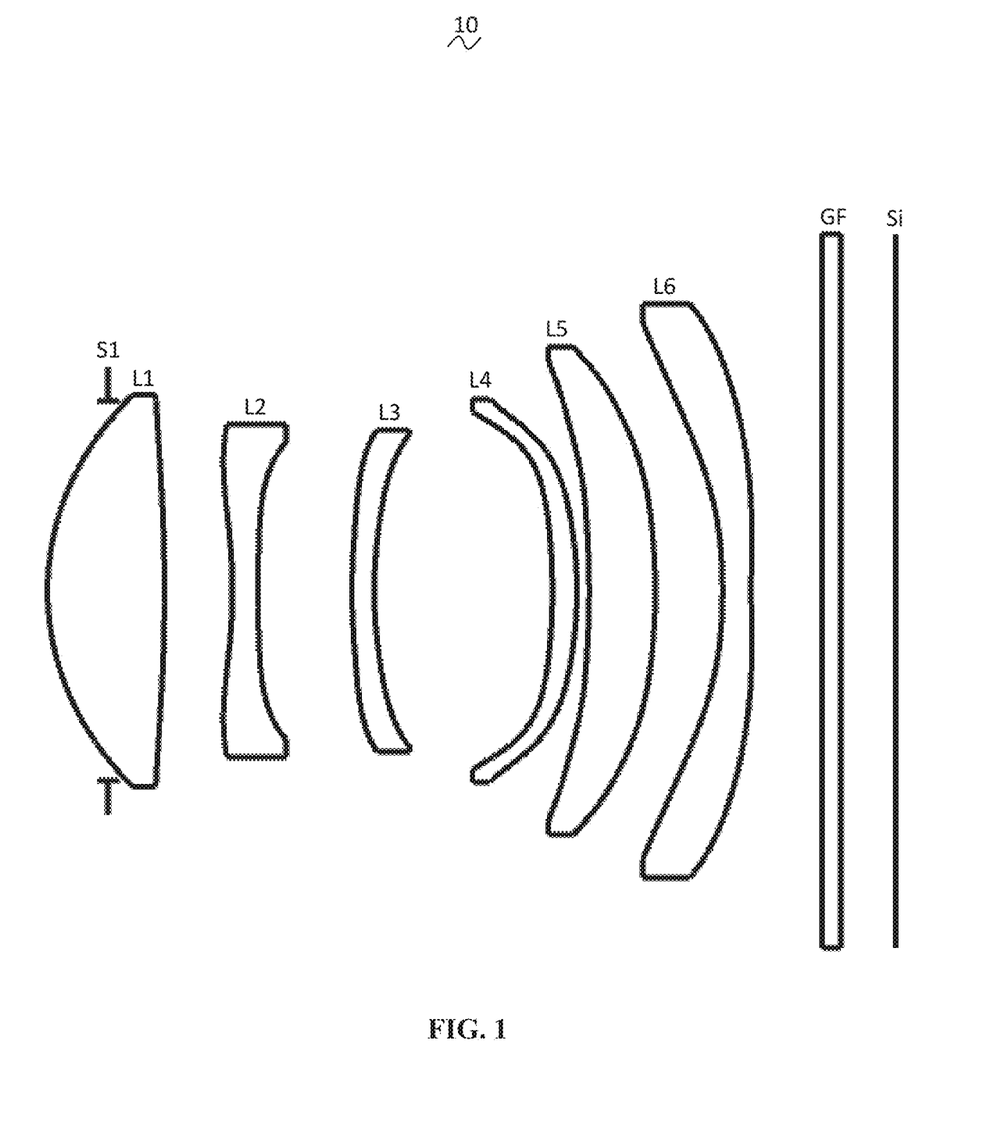
FIG. 1 shows a schematic diagram of a structure of a camera optical lens according to Embodiment 1 of the present disclosure.

Referring to the drawings, the present application provides a camera optical lens 10. FIG. 1 shows a schematic diagram of a structure of a camera optical lens according to Embodiment 1 of the present application. The camera optical lens 10 includes six lenses. Specifically, a left side is an object side, a right side is an image side, the camera optical lens 10 including, from the object side to the image side: an aperture S1, a first lens L1, a second lens L2, a third lens L3, a fourth lens L4, a fifth lens L5 and a sixth lens L6. An optical element such as an optical filter GF may be arranged between the sixth lens L6 and an image surface S1.

In the embodiment, the first lens L1, the second lens L2, the third lens L3, the fourth lens L4, the fifth lens L5 and the sixth lens L6 are all made of plastic material. In other embodiments, each lens may also be of another material.

In the embodiment, a focal length of the camera optical lens 10 is defined as f, a focal length of the first lens L1 is defined as f1, and the camera optical lens 10 satisfies a condition of $0.35 \le f1/f \le 0.50$, which stipulates a ratio of the focal length f1 of the first lens L1 to the focal length f of the camera optical lens 10. Within this range, a spherical aberration and a field curvature of the camera optical lens can be effectively balanced.

A curvature radius of an object-side surface of the second lens L2 is defined as R3, a curvature radius of an image-side surface of the second lens L2 is defined as R4, and the camera optical lens 10 further satisfies condition of $-30.00 \le R4/R3 \le -2.00$, which stipulates a shape of the second lens L2. Within this range, a degree of deflection of light passing through the lens can be alleviated, and aberrations can be reduced effectively.

A curvature radius of an object-side surface of the third lens L3 is defined as R5, a curvature radius of an image-side surface of the third lens L3 is defined as R6, and the camera optical lens 10 further satisfies a condition of $1.50 \le (R5+R6)/(R5-R6) \le 30.00$, which stipulates a shape of the third lens L3. This range is beneficial for correcting the problem of off-axis aberration.

A focal length of the fifth lens L5 is defined as f5, and the camera optical lens 10 further satisfies a condition of $1.50 \le f5/f \le 10.00$, which stipulates a ratio of the focal length f5 of the fifth lens L5 to the focal length f of the camera optical lens 10. This distribution of focal length results in the camera optical lens having excellent image quality and lower sensitivity.

In the embodiment, the first lens L1 has a positive refractive power, an object-side surface of the first lens L1 is convex in a paraxial region, and an image-side surface of the first lens L1 is convex in the paraxial region. In other embodiments, the object-side surface and the image-side surface of the first lens L1 may also be set to other concave or convex distribution situations.

A curvature radius of the object-side surface of the first lens L1 is defined as R1, a curvature radius of the image-side surface of the first lens L1 is defined as R2, and the camera optical lens 10 further satisfies a condition of $-1.45 \le (R1+R2)/(R1-R2) \le -0.27$. By reasonably controlling the shape of the first lens L1, the first lens L1 can effectively correct the spherical aberration of the camera optical lens. Preferably, the camera optical lens 10 further satisfies a condition of $-0.91 \le (R1+R2)/(R1-R2) \le -0.34$.

An on-axis thickness of the first lens L1 is defined as d1, a total optical length from the object-side surface of the first lens L1 to an image surface of the camera optical lens 10 along an optical axis is defined as TTL, and the camera optical lens 10 satisfies a condition of $0.06 \le d1/TTL \le 0.25$. This range is beneficial for achieving an ultra-thin structure. Preferably, the camera optical lens 10 further satisfies a condition of $0.10 \le d1/TTL \le 0.20$.

In the embodiment, the second lens L2 has a negative refractive power, the object-side surface of the second lens L2 is concave in the paraxial region, and the image-side surface of the second lens L2 is concave in the paraxial region. In other embodiments, the object-side surface and the image-side surface of the second lens L2 may also be set to other concave or convex distribution situations.

In the embodiment, a focal length of the second lens L2 is defined as f2, the camera optical lens 10 satisfies a condition of $-1.32 \leq f2/f \leq -0.40$. By controlling the negative refractive power of the second lens L2 within a reasonable range. This range is beneficial for correcting the aberration of the camera optical lens. Preferably, the camera optical lens 10 further satisfies a condition of $-0.83 \leq f2/f \leq -0.50$.

Further, the camera optical lens 10 satisfies a condition of $-1.87 \leq (R3+R4)/(R3-R4) \leq -0.23$, which stipulates a shape of the second lens L2. This range leads to a development towards ultra-thin structures and facilitates correcting the problem of on-axis aberration. Preferably, the camera optical lens 10 further satisfies a condition of $-1.17 \leq (R3+R4)/(R3-R4) \leq -0.29$.

An on-axis thickness of the second lens L2 is defined as d3, and the camera optical lens 10 further satisfies a condition of $0.02 \leq d3/TTL \leq 0.07$. This range is beneficial for achieving an ultra-thin structure. Preferably, the camera optical lens 10 further satisfies a condition of $0.02 \leq d3/TTL \leq 0.06$.

In the embodiment, the third lens L3 has a negative refractive power, the object-side surface of the third lens L3 is convex in the paraxial region, and the image-side surface of the third lens L3 is concave in the paraxial region. In other embodiments, the object-side surface and the image-side surface of the third lens L3 may also be set to other concave or convex distribution situations.

A focal length of the third lens L3 is defined as f3, and the camera optical lens 10 further satisfies a condition of $-34.70 \leq f3/f \leq -0.49$. This distribution of focal length results in the camera optical lens having excellent image quality and lower sensitivity. Preferably, the camera optical lens 10 further satisfies a condition of $-21.69 \leq f3/f \leq -0.62$.

An on-axis thickness of the third lens L3 is defined as d5, and the camera optical lens 10 further satisfies a condition of $0.01 \leq d5/TTL \leq 0.04$, This range is beneficial for achieving an ultra-thin structure. Preferably, the camera optical lens 10 further satisfies a condition of $0.02 \leq d5/TTL \leq 0.03$.

In the embodiment, the fourth lens L4 has a positive refractive power, an object-side surface of the fourth lens L4 is concave in the paraxial region, and an image-side surface of the fourth lens L4 is convex in the paraxial region. In other embodiments, the object-side surface and the image-side surface of the fourth lens L4 may also be set to other concave or convex distribution situations.

A focal length of the fourth lens L4 is defined as f4, and the camera optical lens 10 further satisfies a condition of $-28.03 \leq f4/f \leq 3.04$, which stipulates a ratio of the focal length f4 of the fourth lens L4 to the focal length f of the camera optical lens 10. Within this range, it helps to improve the performance of the camera optical lens. Preferably, the camera optical lens 10 further satisfies a condition of $-17.52 \leq f4/f \leq 2.43$.

A curvature radius of the object-side surface of the fourth lens L4 is defined as R7, a curvature radius of the image-side surface of the fourth lens L4 is defined as R8, and the camera optical lens 10 further satisfies a condition of $-50.54 \leq (R7+R8)/(R7-R8) \leq 6.91$, which stipulates a shape of the fourth lens L4. This range leads to a development towards ultra-thin structures and facilities correcting the problem of on-axis aberration. Preferably, the camera optical lens 10 further satisfies a condition of $-31.59 \leq (R7+R8)/(R7-R8) \leq 5.53$.

An on-axis thickness of the fourth lens L4 is d7, and the camera optical lens 10 further satisfies a condition of $0.01 \leq d7/TTL \leq 0.05$. This range is beneficial for achieving an ultra-thin structure. Preferably, the camera optical lens 10 further satisfies a condition of $0.02 \leq d7/TTL \leq 0.04$.

In the embodiment, the fifth lens L5 has a positive refractive power, an object-side surface of the fifth lens L5 is concave in the paraxial region, and an image-side surface of the fifth lens L5 is convex in the paraxial region. In other embodiments, the object-side surface and the image-side surface of the fifth lens L5 may also be set to other concave or convex distribution situations.

A curvature radius of the object-side surface of the fifth lens L5 is defined as R9, a curvature radius of the image-side surface of the fifth lens L5 is defined as R10, and the camera optical lens 10 further satisfies a condition of $1.29 \leq (R9+R10)/(R9-R10) \leq 10.25$, which stipulates a shape of the fifth lens L5. Within this range, a development towards ultra-thin would facilitate correcting a problem of an off-axis aberration. Preferably, the camera optical lens 10 further satisfies a condition of $2.06 \leq (R9+R10)/(R9-R10) \leq 8.20$.

An on-axis thickness of the fifth lens L5 is defined as d9, and the camera optical lens 10 further satisfies a condition of $0.03 \leq d9/TTL \leq 0\ldots16$. This range is beneficial for achieving an ultra-thin structure. Preferably, the camera optical lens 10 further satisfies a condition of $0.05 \leq d9/TTL \leq 0.13$.

In the embodiment, the sixth lens has a negative refractive power, an object-side surface of the sixth lens L6 is concave in the paraxial region, and an image-side surface of the sixth lens L6 is concave in the paraxial region. In other embodiments, the object-side surface and the image-side surface of the sixth lens L6 may also be set to other concave or convex distribution situations.

A focal length of the sixth lens L6 is defined as f6, and the camera optical lens 10 further satisfies a condition of $-4.21 \leq f6/f \leq -0.53$. This distribution of focal length results in the camera optical lens having excellent image quality and lower sensitivity. Preferably, the camera optical lens 10 further satisfies a condition of $-2.63 \leq f6/f \leq -0.66$.

A curvature radius of the object-side surface of the sixth lens L6 is defined as R11, a curvature radius of the image-side surface of the sixth lens L6 is defined as R12, and the camera optical lens 10 further satisfies a condition of $-3.62 \leq (R11+R12)/(R11-R12) \leq -0.36$, which stipulates a shape of the sixth lens L6. This range leads to a development towards ultra-thin structures and facilitates correcting the problem of on-axis aberration. Preferably, the camera optical lens 10 further satisfies a condition of $-2.26 \leq (R11+R12)/(R11-R12) \leq -0.45$.

An on-axis thickness of the sixth lens L6 is defined as d11, and the camera optical lens 10 further satisfies a condition of $0.02 \leq d11/TTL \leq 0.48$. This range is beneficial for achieving an ultra-thin structure. Preferably, the camera optical lens 10 further satisfies a condition of $0.03 \leq d11/TTL \leq 0.38$.

In the embodiment, a combined focal length of the first lens L1 and the second lens L2 is defined as f12, and the camera optical lens 10 further satisfies a condition of $0.29 \leq f12/f \leq 1.46$. Within this range, an aberration and a distortion of the camera optical lens can be eliminated, and a back focal length of the camera optical lens can be suppressed to maintain a miniaturization of an imaging lens system group. Preferably, the camera optical lens 10 further satisfies a condition of $0.47 \leq f12/f \leq 1.17$.

In the embodiment, an F number is defined as FNO, and the camera optical lens 10 further satisfies a condition of FNO≤2.52, thereby facilitating realization of a large aperture. Preferably, the camera optical lens 10 further satisfies a condition of FNO≤2.47.

In the embodiment, an image height of the camera optical lens 10 is defined as IH, and the camera optical lens 10 further satisfies a condition of f/IH≥2.70, thereby facilitating realization of a long focal length.

In the embodiment, the camera optical lens 10 further satisfies a condition of TTL/IH≤3.15, which is beneficial to achieve ultra-thin.

Satisfying these conditions results in the camera optical lens having excellent optical performance, and meeting the design requirements for a long focal length and ultra-thin structure. According to these characteristics, the camera optical lens is particularly suitable for a mobile camera lens component and a WEB camera lens composed of high pixel CCD, CMOS.

In the following, embodiments will be used to describe the camera optical lens 10 of the present disclosure. The symbols recorded in each embodiment will be described as follows. The focal length, on-axis distance, curvature radius, on-axis thickness, inflexion point position, and arrest point position are all in units of mm.

TTL: Optical length (the total optical length from the object-side surface of the first lens L1 to the image surface S1 of the camera optical lens along the optical axis) in mm.

The F number (FNO) means a ratio of an effective focal length of the camera optical lens to an entrance pupil diameter (ENPD).

Preferably, inflexion points and/or arrest points can be arranged on the object-side surface and the image-side surface of the lens, so as to satisfy the demand for high quality imaging. The description below can be referred for specific implementations.

Table 1 and Table 2 show design data of the camera optical lens 10 shown in FIG. 1.

TABLE 1

|     | R       | d      |     | nd     |    | vd    |
| --- | ------- | ------ | --- | ------ | --- | ----- |
| S1  | ∞       | d0=    | -0.676 |    |    |       |
| R1  | 2.906   | d1=    | 1.308  | nd1 | 1.5444 | v1 | 55.82 |
| R2  | -18.310 | d2=    | 0.763  |    |    |       |
| R3  | -5.433  | d3=    | 0.288  | nd2 | 1.6610 | v2 | 20.53 |
| R4  | 21.515  | d4=    | 1.050  |    |    |       |
| R5  | 6.151   | d5=    | 0.250  | nd3 | 1.5444 | v3 | 55.82 |
| R6  | 4.492   | d6=    | 1.995  |    |    |       |
| R7  | -7.551  | d7=    | 0.275  | nd4 | 1.6700 | v4 | 19.39 |
| R8  | -4.431  | d8=    | 0.137  |    |    |       |
| R9  | -8.447  | d9=    | 0.741  | nd5 | 1.6700 | v5 | 19.39 |
| R10 | -6.290  | d10=   | 0.753  |    |    |       |
| R11 | -5.708  | d11=   | 0.322  | nd6 | 1.5346 | v6 | 55.69 |
| R12 | 19.002  | d12=   | 0.791  |    |    |       |
| R13 | ∞       | d13=   | 0.210  | ndg | 1.5168 | vg | 64.17 |
| R14 | ∞       | d14=   | 0.616  |    |    |       |

Here, meanings of various symbols will be described as follows.

S1: aperture.

R: curvature radius of an optical surface, a central curvature radius for a lens.

R1: curvature radius of the object-side surface of the first lens L1.

R2: curvature radius of the image-side surface of the first lens L1.

R3: curvature radius of the object-side surface of the second lens L2.

R4: curvature radius of the image-side surface of the second lens L2.

R5: curvature radius of the object-side surface of the third lens L3.

R6: curvature radius of the image-side surface of the third lens L3.

R7: curvature radius of the object-side surface of the fourth lens L4.

R8: curvature radius of the image-side surface of the fourth lens L4.

R9: curvature radius of the object-side surface of the fifth lens L5.

R10: curvature radius of the image-side surface of the fifth lens L5.

R11: curvature radius of the object-side surface of the sixth lens L6.

R12: curvature radius of the image-side surface of the sixth lens L6.

R13: curvature radius of an object-side surface of the optical filter GF.

R14: curvature radius of an image-side surface of the optical filter GF.

d: on-axis thickness of a lens and an on-axis distance between lens.

d0: on-axis distance from the aperture S1 to the object-side surface of the first lens L1.

d1: on-axis thickness of the first lens L1.

d2: on-axis distance from the image-side surface of the first lens L1 to the object-side surface of the second lens L2.

d3: on-axis thickness of the second lens L2.

d4: on-axis distance from the image-side surface of the second lens L2 to the object-side surface of the third lens L3.

d5: on-axis thickness of the third lens L3.

d6: on-axis distance from the image-side surface of the third lens L3 to the object-side surface of the fourth lens L4.

d7: on-axis thickness of the fourth lens L4.

d8: on-axis distance from the image-side surface of the fourth lens L4 to the object-side surface of the fifth lens L5.

d9: on-axis thickness of the fifth lens L5.

d10: on-axis distance from the image-side surface of the fifth lens L5 to the object-side surface of the sixth lens L6.

d11: on-axis thickness of the sixth lens L6.

d12: on-axis distance from the image-side surface of the sixth lens L6 to the object-side surface of the optical filter GF.

d13: on-axis thickness of the optical filter GF.

d14: on-axis distance from the image-side surface of the optical filter GF to the image surface S1.

nd: refractive index of a d line (d line is green light with a wavelength of 550 nm).

nd1: refractive index of the d line of the first lens L1.

nd2: refractive index of the d line of the second lens L2.

nd3: refractive index of the d line of the third lens L3.

nd4: refractive index of the d line of the fourth lens L4.

nd5: refractive index of the d line of the fifth lens L5.

nd6: refractive index of the d line of the sixth lens L6.

ndg: refractive index of the d line of the optical filter GF.

vd: abbe number.

v1: abbe number of the first lens L1.

v2: abbe number of the second lens L2.

v3: abbe number of the third lens L3.

v4: abbe number of the fourth lens L4.

v5: abbe number of the fifth lens L5.

v6: abbe number of the sixth lens L6.

vg: abbe number of the optical filter GF.

Table 2 shows aspherical surface data of each lens of the camera optical lens 10 in Embodiment 1 of the present disclosure.

TABLE 2

| | Conic coefficient | Aspheric surface coefficients | | | | |
|---|---|---|---|---|---|---|
| | k | A4 | A6 | A8 | A10 | A12 |
| R1 | −2.0070E−01 | 3.6452E−04 | 4.6727E−06 | −3.5158E−05 | 4.0603E−05 | −3.1080E−05 |
| R2 | −6.7037E+01 | −1.1470E−03 | 1.0613E−03 | −2.4521E−04 | −2.9772E−05 | 4.9365E−05 |
| R3 | −6.1659E+01 | −4.1711E−02 | 6.5523E−02 | −5.2302E−02 | 3.1195E−02 | −1.3550E−02 |
| R4 | 6.6314E+01 | −1.9078E−04 | 2.5165E−02 | −7.1973E−03 | −6.6210E−03 | 1.0144E−02 |
| R5 | 4.8161E+00 | −5.0071E−02 | 2.8255E−02 | −8.6779E−03 | 4.1068E−03 | −2.9210E−03 |
| R6 | 3.3871E+00 | −4.0423E−02 | 2.5820E−02 | −1.1249E−02 | 7.3533E−03 | −5.2567E−03 |
| R7 | 9.8712E+00 | −1.4726E−02 | 1.4871E−02 | −9.5031E−03 | −3.0599E−03 | 4.9474E−03 |
| R8 | 1.4554E+00 | 8.9291E−03 | 1.3958E−02 | −2.5669E−02 | 1.1979E−02 | −1.8706E−03 |
| R9 | −5.2428E−01 | 2.7703E−02 | −9.6647E−03 | −1.4328E−02 | 1.2622E−02 | −4.6286E−03 |
| R10 | 3.0619E−01 | 1.3895E−02 | −1.2248E−02 | 1.9885E−03 | 5.5031E−04 | −2.9987E−04 |
| R11 | −1.1095E+00 | −1.7244E−02 | −2.7075E−03 | 5.0039E−03 | −1.9096E−03 | 3.9946E−04 |
| R12 | −8.4732E+01 | −3.4388E−02 | 6.3713E−03 | 8.3623E−04 | −7.4837E−04 | 1.8954E−04 |

| | Conic coefficient | Aspheric surface coefficients | | | |
|---|---|---|---|---|---|
| | k | A14 | A16 | A18 | A20 |
| R1 | −2.0070E−01 | 1.2527E−05 | −2.9275E−06 | 3.6729E−07 | −1.9327E−08 |
| R2 | −6.7037E+01 | −2.0098E−05 | 4.3000E−06 | −4.8184E−07 | 2.2012E−08 |
| R3 | −6.1659E+01 | 4.0810E−03 | −7.9699E−04 | 9.0027E−05 | −4.4419E−06 |
| R4 | 6.6314E+01 | −6.2220E−03 | 2.1138E−03 | −3.8528E−04 | 2.9444E−05 |
| R5 | 4.8161E+00 | 1.5086E−03 | −4.4799E−04 | 7.0563E−05 | −4.6187E−06 |
| R6 | 3.3871E+00 | 2.5720E−03 | −7.5195E−04 | 1.2050E−04 | −8.1753E−06 |
| R7 | 9.8712E+00 | −2.3086E−03 | 5.2615E−04 | −5.8940E−05 | 2.7206E−06 |
| R8 | 1.4554E+00 | −4.1184E−04 | 2.0961E−04 | −3.0450E−05 | 1.5700E−06 |
| R9 | −5.2428E−01 | 9.6001E−04 | −1.1812E−04 | 8.0703E−06 | −2.3571E−07 |
| R10 | 3.0619E−01 | 5.9297E−05 | −6.1151E−06 | 3.0344E−07 | −4.5989E−09 |
| R11 | −1.1095E+00 | −5.1943E−05 | 4.2203E−06 | −1.9782E−07 | 4.1054E−09 |
| R12 | −8.4732E+01 | −2.6784E−05 | 2.2596E−06 | −1.0659E−07 | 2.1640E−09 |

For convenience, an aspheric surface of each lens surface uses the aspheric surfaces shown in equation (1). However, the present application is not limited to the aspherical polynomials form shown in equation (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1)$$

Here, K is a conic coefficient; A4, A6, A8, A10, A12, A14, A16, A18, and A20 are aspheric surface coefficients; c is a curvature at the center of the optical surface; r is a vertical distance between a point on an aspheric curve and the optical axis; z is a depth of the aspheric surface (the vertical distance between the point x from the optical axis on the aspheric surface and a tangent plane tangent to a vertex on the optical axis of the aspheric surface).

Table 3 and Table 4 show design data of inflexion points and arrest points of the camera optical lens 10 according to Embodiment 1 of the present disclosure. Here P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6. The data in the column named "inflexion point position" refer to vertical distances from inflexion points arranged on each lens surface to the optical axis of the camera optical lens 10. The data in the column named "arrest point position" refer to vertical distances from arrest points arranged on each lens surface to the optical axis of the camera optical lens 10.

TABLE 3

| | Number of inflexion point | Inflexion point position 1 | Inflexion point position 2 |
|---|---|---|---|
| P1R1 | 0 | / | / |
| P1R2 | 2 | 1.695 | 1.965 |
| P2R1 | 1 | 0.825 | / |
| P2R2 | 0 | / | / |
| P3R1 | 0 | / | / |
| P3R2 | 0 | / | / |
| P4R1 | 1 | 1.915 | / |
| P4R2 | 1 | 1.975 | / |
| P5R1 | 1 | 2.425 | / |
| P5R2 | 1 | 2.625 | / |
| P6R1 | 1 | 2.515 | / |
| P6R2 | 1 | 0.365 | / |

TABLE 4

| | Number of arrest point | Arrest point position 1 |
|---|---|---|
| P1R1 | 0 | / |
| P1R2 | 0 | / |
| P2R1 | 1 | 1.445 |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 1 | 0.645 |

Figure 2:
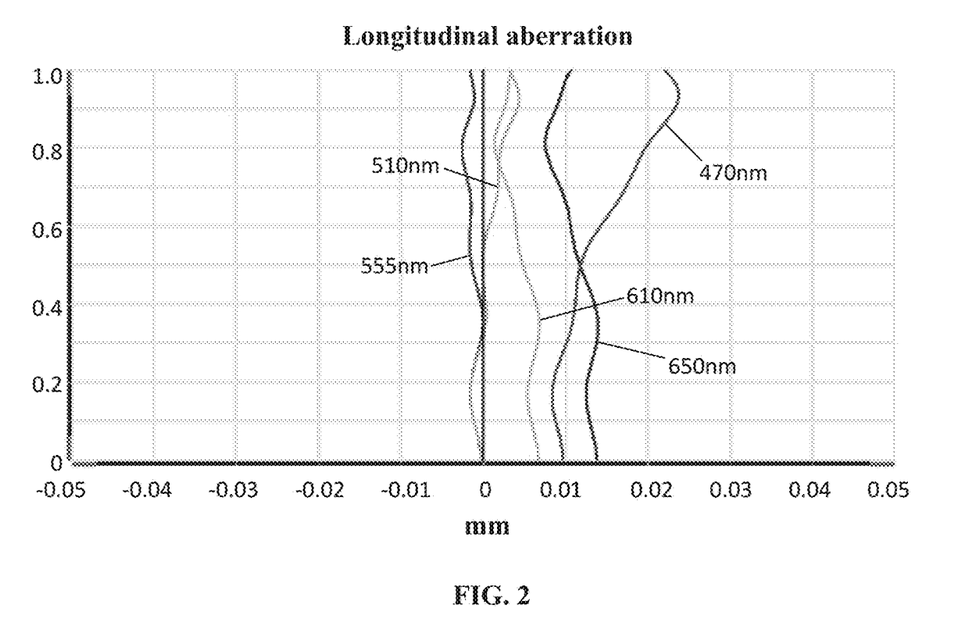
FIG. 2 shows a schematic diagram of a longitudinal aberration of the camera optical lens shown in FIG. 1.
Figure 3:
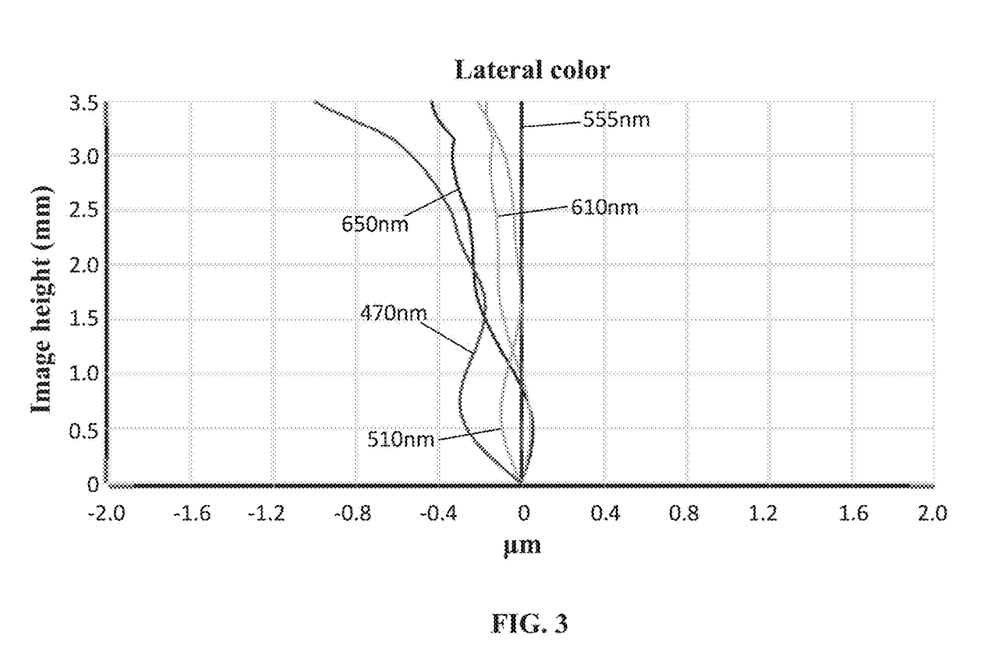
FIG. 3 shows a schematic diagram of a lateral color of the camera optical lens shown in FIG. 1.
Figure 4:
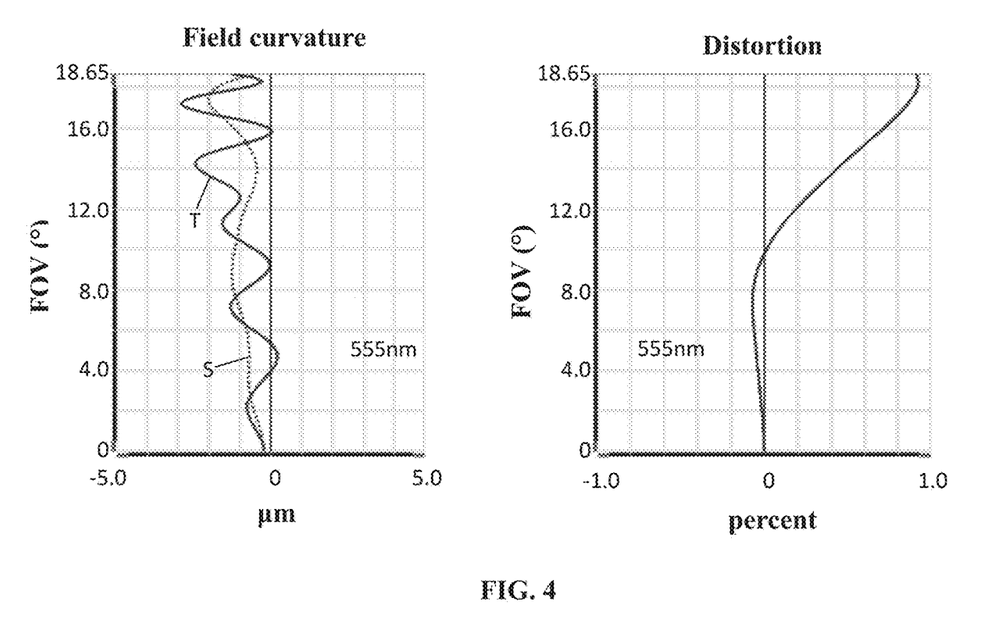
FIG. 4 shows a schematic diagram of a field curvature and a distortion of the camera optical lens shown in FIG. 1.

FIG. 2 and FIG. 3 illustrate a longitudinal aberration and a lateral color with wavelengths of 650 nm, 610 nm, 555 nm, 510 nm and 470 nm after passing the camera optical lens 10 according to Embodiment 1, respectively. FIG. 4 illustrates a field curvature and a distortion with a wavelength of 555 nm after passing the camera optical lens 10 according to Embodiment 1. A field curvature S in FIG. 4 is a field curvature in a sagittal direction, and T is a field curvature in a tangential direction.

Table 13 in the following shows various values of Embodiments 1, 2, and 3, and also values corresponding to parameters which are specified in the above conditions.

As shown in Table 13, Embodiment 1 satisfies the above conditions.

In the embodiment, an entrance pupil diameter (ENPD) of the camera optical lens 10 is 4.263 mm, an image height IH of 1.0H is 3.500 mm, a FOV (field of view) in a diagonal direction is 37.30°. Thus, the camera optical lens can meet the design requirements of a long focal length and is ultra-thin, and its on-axis and off-axis chromatic aberrations are fully corrected, thereby achieving excellent optical characteristics.

Embodiment 2

Figure 5:
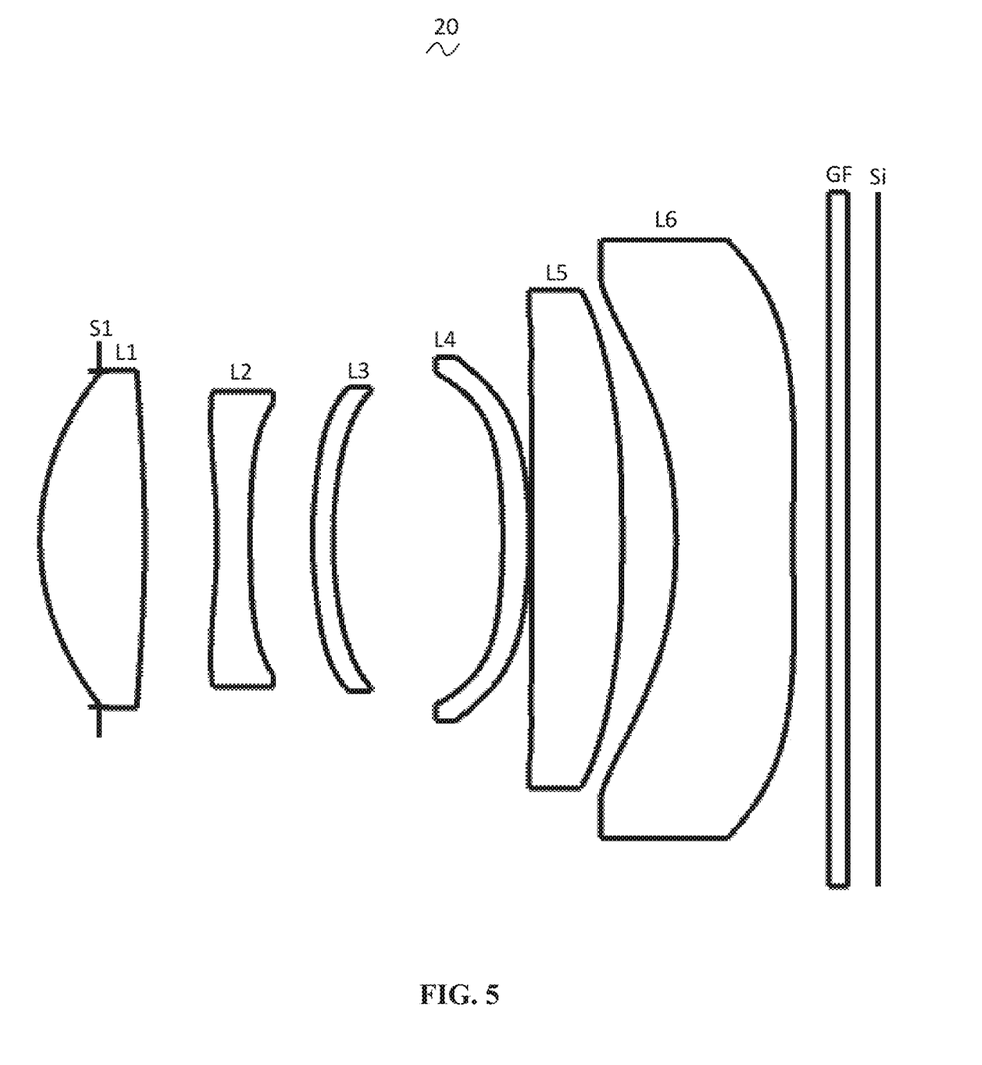
FIG. 5 shows a schematic diagram of a structure of a camera optical lens according to Embodiment 2 of the present disclosure.

FIG. 5 shows a schematic diagram of a structure of a camera optical lens according to Embodiment 2 of the present disclosure. Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

|  | R | d |  | nd |  | vd |
|---|---|---|---|---|---|---|
| S1 | ∞ | d0= | −0.658 |  |  |  |
| R1 | 2.973 | d1= | 1.177 | nd1 | 1.5444 | v1 | 55.82 |
| R2 | −15.189 | d2= | 0.812 |  |  |  |
| R3 | −6.288 | d3= | 0.372 | nd2 | 1.6610 | v2 | 20.53 |
| R4 | 12.891 | d4= | 0.700 |  |  |  |
| R5 | 4.529 | d5= | 0.230 | nd3 | 1.5444 | v3 | 55.82 |
| R6 | 4.235 | d6= | 1.909 |  |  |  |
| R7 | −7.553 | d7= | 0.301 | nd4 | 1.6700 | v4 | 19.39 |
| R8 | −4.859 | d8= | 0.030 |  |  |  |
| R9 | −82.392 | d9= | 1.010 | nd5 | 1.6700 | v5 | 19.39 |
| R10 | −36.252 | d10= | 0.605 |  |  |  |
| R11 | −5.704 | d11= | 1.318 | nd6 | 1.5346 | v6 | 55.69 |
| R12 | 29.813 | d12= | 0.400 |  |  |  |
| R13 | ∞ | d13= | 0.210 | ndg | 1.5168 | vg | 64.17 |
| R14 | ∞ | d14= | 0.343 |  |  |  |

Table 6 shows aspherical surface data of each lens of the camera optical lens 20 in Embodiment 2 of the present disclosure.

TABLE 6

|  | Conic coefficient | Aspheric surface coefficients | | | | |
|---|---|---|---|---|---|---|
|  | k | A4 | A6 | A8 | A10 | A12 |
| R1 | −2.4293E−01 | 3.6724E−04 | −2.5928E−05 | −8.9795E−05 | 1.3988E−04 | −1.2701E−04 |
| R2 | −8.3064E+01 | 5.1483E−04 | 1.6630E−04 | 1.6696E−04 | −3.2930E−04 | 2.3055E−04 |
| R3 | −7.7557E+01 | −1.8599E−02 | 3.9055E−02 | −3.5669E−02 | 2.5778E−02 | −1.3845E−02 |
| R4 | 1.3929E+01 | 7.3577E−03 | 1.2746E−02 | −3.4533E−03 | −1.5564E−03 | 3.4508E−03 |
| R5 | 4.3372E+00 | −4.6314E−02 | 2.0506E−02 | −4.8873E−03 | 5.2074E−03 | −5.1167E−03 |
| R6 | 3.6676E+00 | −3.1835E−02 | 1.4424E−02 | −3.7835E−03 | 4.7439E−03 | −4.6968E−03 |
| R7 | 9.8710E+00 | −2.9956E−03 | −1.0989E−03 | −3.7239E−03 | −2.3433E−03 | 3.0589E−03 |
| R8 | 1.3207E+00 | 2.8780E−02 | −2.8224E−02 | 1.1853E−02 | −6.2923E−03 | 3.0494E−03 |
| R9 | −9.9000E+01 | 2.2310E−02 | −2.9258E−02 | 1.7037E−02 | −5.5498E−03 | 1.1028E−03 |
| R10 | 3.0632E−01 | −8.0818E−03 | −5.0088E−03 | 3.3092E−03 | −7.4247E−04 | 4.9148E−05 |
| R11 | −1.1087E+00 | −3.4429E−03 | −7.8293E−03 | 4.4898E−03 | −9.5267E−04 | 6.0379E−05 |
| R12 | −7.4621E+01 | −5.3371E−03 | −3.7593E−03 | 1.9676E−03 | −4.9997E−04 | 7.7854E−05 |

|  | Conic coefficient | Aspheric surface coefficients | | | |
|---|---|---|---|---|---|
|  | k | A14 | A16 | A18 | A20 |
| R1 | −2.4293E−01 | 6.2264E−05 | −1.7517E−05 | 2.6482E−06 | −1.6973E−07 |
| R2 | −8.3064E+01 | −9.1352E−05 | 2.0976E−05 | −2.5991E−06 | 1.3079E−07 |
| R3 | −7.7557E+01 | 5.1751E−03 | −1.2560E−03 | 1.7668E−04 | −1.0880E−05 |
| R4 | 1.3929E+01 | −2.4440E−03 | 9.3988E−04 | −1.9465E−04 | 1.7080E−05 |
| R5 | 4.3372E+00 | 2.7645E−03 | −8.5328E−04 | 1.4241E−04 | −1.0001E−05 |
| R6 | 3.6676E+00 | 2.4837E−03 | −7.3528E−04 | 1.1489E−04 | −7.2224E−06 |
| R7 | 9.8710E+00 | −1.3103E−03 | 2.7569E−04 | −2.8502E−05 | 1.2143E−06 |
| R8 | 1.3207E+00 | −9.8980E−04 | 1.8879E−04 | −1.8915E−05 | 7.7939E−07 |
| R9 | −9.9000E+01 | −1.3457E−04 | 9.4266E−06 | −3.0889E−07 | 1.7953E−09 |
| R10 | 3.0632E−01 | 8.6864E−06 | −2.0070E−06 | 1.5566E−07 | −4.4667E−09 |
| R11 | −1.1087E+00 | 9.8005E−06 | −2.1124E−06 | 1.5090E−07 | −3.9508E−09 |
| R12 | −7.4621E+01 | −7.9938E−06 | 5.3286E−07 | −2.0843E−08 | 3.6071E−10 |

Table 7 and table 8 show design data of inflexion points and arrest points of each lens of the camera optical lens 20 lens according to Embodiment 2 of the present disclosure.

TABLE 7

| | Number of inflexion points | Inflexion point position 1 | Inflexion point position 2 | Inflexion point position 3 | Inflexion point position 4 |
|---|---|---|---|---|---|
| P1R1 | 0 | / | / | / | / |
| P1R2 | 0 | / | / | / | / |
| P2R1 | 1 | 0.775 | / | / | / |
| P2R2 | 0 | / | / | / | / |
| P3R1 | 0 | / | / | / | / |
| P3R2 | 0 | / | / | / | / |
| P4R1 | 0 | / | / | / | / |
| P4R2 | 1 | 2.015 | / | / | / |
| P5R1 | 4 | 0.235 | 0.675 | 1.375 | 2.015 |
| P5R2 | 0 | / | / | / | / |
| P6R1 | 1 | 2.445 | / | / | / |
| P6R2 | 2 | 0.595 | 3.415 | / | / |

TABLE 8

| | Number of arrest points | Arrest point position 1 | Arrest point position 2 | Arrest point position 3 | Arrest point position 4 |
|---|---|---|---|---|---|
| P1R1 | 0 | / | / | / | / |
| P1R2 | 0 | / | / | / | / |
| P2R1 | 1 | 1.375 | / | / | / |
| P2R2 | 0 | / | / | / | / |
| P3R1 | 0 | / | / | / | / |
| P3R2 | 0 | / | / | / | / |
| P4R1 | 0 | / | / | / | / |
| P4R2 | 0 | / | / | / | / |
| P5R1 | 4 | 0.455 | 0.835 | 1.835 | 2.145 |
| P5R2 | 0 | / | / | / | / |
| P6R1 | 0 | / | / | / | / |
| P6R2 | 1 | 0.995 | / | / | / |

Figure 6:
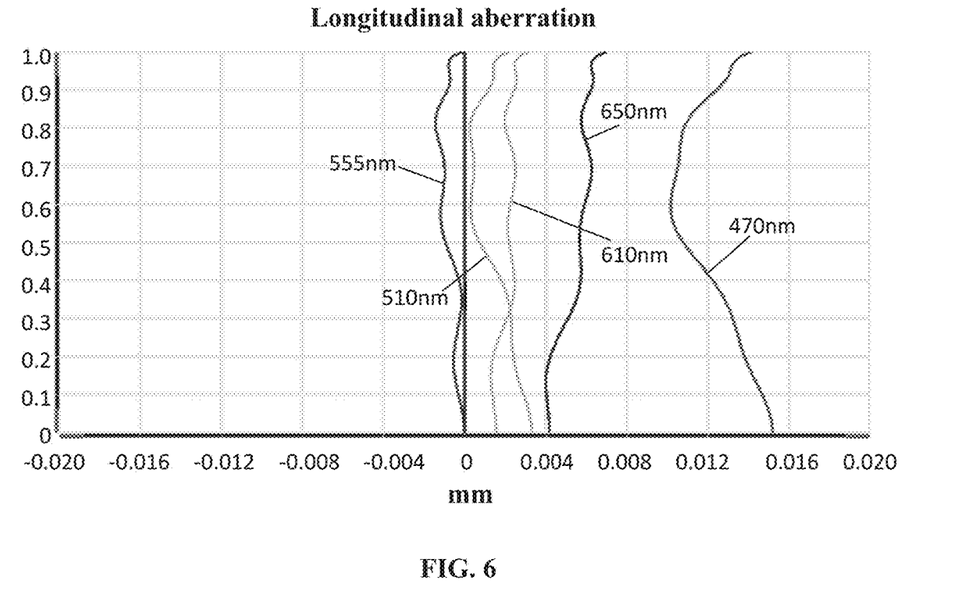
FIG. 6 shows a schematic diagram of a longitudinal aberration of the camera optical lens shown in FIG. 5.
Figure 7:
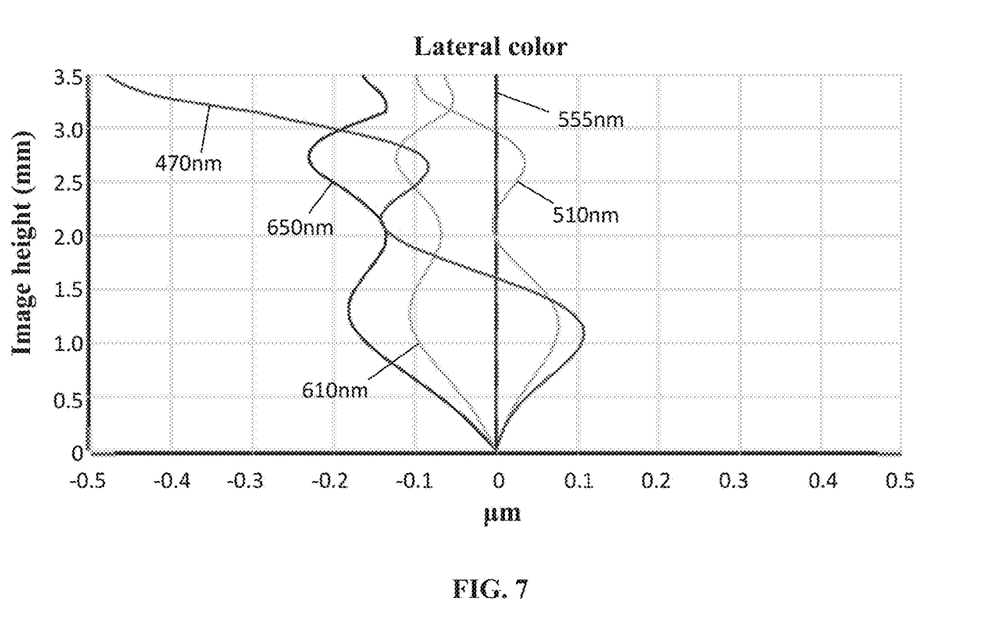
FIG. 7 shows a schematic diagram of a lateral color of the camera optical lens shown in FIG. 5.
Figure 8:
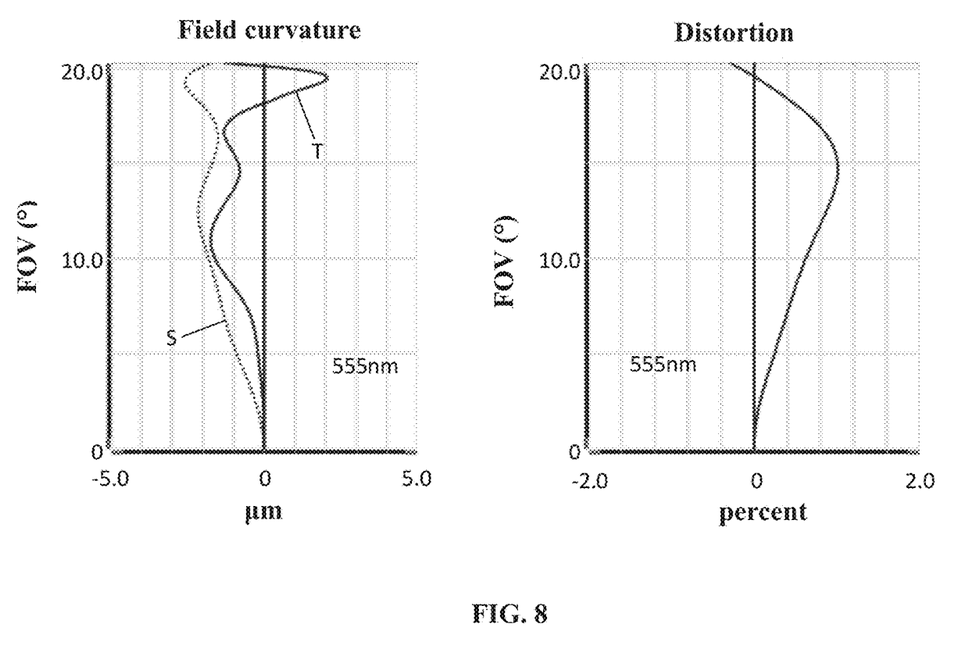
FIG. 8 shows a schematic diagram of a field curvature and a distortion of the camera optical lens shown in FIG. 5.

FIG. 6 and FIG. 7 illustrate a longitudinal aberration and a lateral color with wavelengths of 650 nm, 610 nm, 555 nm, 510 nm, and 470 nm after passing the camera optical lens 20 according to Embodiment 2, respectively. FIG. 8 illustrates a field curvature and a distortion with a wavelength of 555 nm after passing the camera optical lens 20 according to Embodiment 2. A field curvature S in FIG. 8 is a field curvature in a sagittal direction, and T is a field curvature in a tangential direction.

As shown in Table 13, Embodiment 2 satisfies the above conditions.

In the embodiment, an entrance pupil diameter (ENPD) of the camera optical lens 20 is 3.881 mm, an image height IH of 1.0H is 3.500 mm, a FOV (field of view) in the diagonal direction is 40.00°. The camera optical lens can meet the design requirements of a long focal length and is ultra-thin, and its on-axis and off-axis chromatic aberrations are fully corrected, thereby achieving excellent optical characteristics.

Embodiment 3

Figure 9:
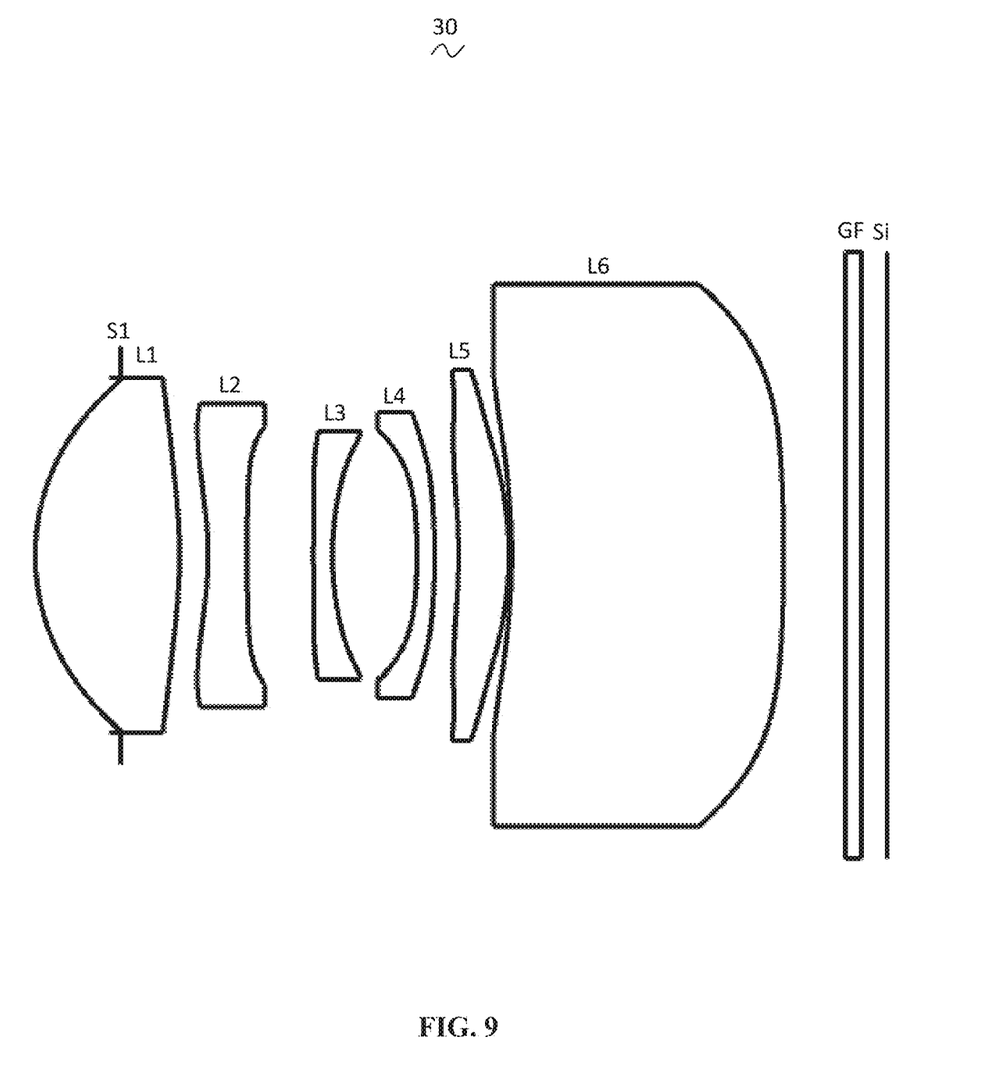
FIG. 9 shows a schematic diagram of a structure of a camera optical lens according to Embodiment 3 of the present disclosure.

FIG. 9 shows a schematic diagram of a structure of a camera optical lens according to Embodiment 3 of the present disclosure. Embodiment 3 is basically the same as Embodiment 1 and involves symbols having the same meanings as Embodiment 1, and only differences therebetween will be described in the following.

In the embodiment, the fourth lens L4 has a negative refractive power, an image-side surface of the sixth lens L6 is convex in a paraxial region.

Table 9 and Table 10 show design data of a camera optical lens 30 in Embodiment 3 of the present disclosure.

TABLE 9

| | R | d | | nd | | vd |
|---|---|---|---|---|---|---|
| S1 | ∞ | d0= | −1.097 | | | |
| R1 | 2.876 | d1= | 1.857 | nd1 | 1.5444 v1 | 55.82 |
| R2 | −6.766 | d2= | 0.366 | | | |
| R3 | −4.670 | d3= | 0.507 | nd2 | 1.6610 v2 | 20.53 |
| R4 | 139.165 | d4= | 0.851 | | | |
| R5 | 17.379 | d5= | 0.243 | nd3 | 1.5444 v3 | 55.82 |
| R6 | 3.586 | d6= | 1.089 | | | |
| R7 | −6.772 | d7= | 0.230 | nd4 | 1.6700 v4 | 19.39 |
| R8 | −7.330 | d8= | 0.307 | | | |
| R9 | −7.036 | d9= | 0.646 | nd5 | 1.6700 v5 | 19.39 |
| R10 | −4.539 | d10= | 0.036 | | | |
| R11 | −8.541 | d11= | 3.498 | nd6 | 1.5346 v6 | 55.69 |
| R12 | −29.670 | d12= | 0.791 | | | |
| R13 | ∞ | d13= | 0.210 | ndg | 1.5168 vg | 64.17 |
| R14 | ∞ | d14= | 0.334 | | | |

Table 10 shows aspherical surface data of each lens of the camera optical lens 30 in Embodiment 3 of the present disclosure.

TABLE 10

| | Conic coefficient | Aspherical surface coefficients | | | | |
|---|---|---|---|---|---|---|
| | k | A4 | A6 | A8 | A10 | A12 |
| R1 | −1.9622E−01 | 6.4364E−04 | 1.1108E−04 | −1.0777E−04 | 9.0280E−05 | −4.7786E−05 |
| R2 | −5.2972E+01 | −6.1879E−03 | 7.7193E−03 | −4.9593E−03 | 2.2338E−03 | −7.1618E−04 |
| R3 | −3.3620E+01 | −1.3508E−02 | 2.2876E−02 | −1.6843E−02 | 9.5333E−03 | −3.8590E−03 |
| R4 | −9.9000E+01 | 7.2281E−03 | 4.8559E−03 | 3.1570E−03 | −5.6118E−03 | 5.1384E−03 |
| R5 | 4.5679E+01 | −6.2386E−02 | 5.7394E−02 | −2.5889E−02 | 8.8617E−03 | −3.4547E−03 |
| R6 | 2.3405E+00 | −5.7450E−02 | 5.1972E−02 | −2.7528E−02 | 1.1794E−02 | −5.4240E−03 |
| R7 | 9.5277E+00 | 6.9316E−03 | −6.1579E−02 | 6.1714E−02 | −5.1260E−02 | 3.0221E−02 |
| R8 | −1.2586E+01 | 4.0286E−02 | −7.5577E−02 | 7.2801E−02 | −5.3613E−02 | 2.8988E−02 |
| R9 | −5.8621E+01 | 1.5067E−02 | −1.7985E−02 | 1.9088E−02 | −1.0624E−02 | 3.4768E−03 |
| R10 | −8.3733E+00 | 7.3588E−03 | −2.6604E−02 | 2.3312E−02 | −1.0759E−02 | 3.0459E−03 |
| R11 | −9.5288E+01 | 1.5803E−04 | −1.8116E−02 | 1.8675E−02 | −9.7001E−03 | 2.9983E−03 |
| R12 | −9.8733E+01 | −3.7073E−03 | −2.6176E−04 | 3.0467E−05 | −1.7028E−05 | 4.6118E−06 |

| | Conic coefficient | Aspherical surface coefficients | | | |
|---|---|---|---|---|---|
| | k | A14 | A16 | A18 | A20 |
| R1 | −1.9622E−01 | 1.4941E−05 | −2.8477E−06 | 2.9847E−07 | −1.3694E−08 |
| R2 | −5.2972E+01 | 1.5661E−04 | −2.2039E−05 | 1.7895E−06 | −6.3770E−08 |
| R3 | −3.3620E+01 | 1.0692E−03 | −1.9065E−04 | 1.9610E−05 | −8.7922E−07 |
| R4 | −9.9000E+01 | −2.7614E−03 | 9.0068E−04 | −1.6328E−04 | 1.2716E−05 |
| R5 | 4.5679E+01 | 1.7097E−03 | −6.3933E−04 | 1.2859E−04 | −1.0850E−05 |
| R6 | 2.3405E+00 | 2.3340E−03 | −6.6493E−04 | 9.5258E−05 | −6.3985E−06 |
| R7 | 9.5277E+00 | −1.1219E−02 | 2.2405E−03 | −1.2438E−04 | −1.7558E−05 |
| R8 | −1.2586E+01 | −1.0923E−02 | 2.6881E−03 | −3.8297E−04 | 2.3690E−05 |
| R9 | −5.8621E+01 | −7.0659E−04 | 8.8018E−05 | −6.1714E−06 | 1.8645E−07 |
| R10 | −8.3733E+00 | −5.3704E−04 | 5.6210E−05 | −3.0951E−06 | 6.4892E−08 |
| R11 | −9.5288E+01 | −5.7010E−04 | 6.5343E−05 | −4.1365E−06 | 1.1098E−07 |
| R12 | −9.8733E+01 | −6.5935E−07 | 5.4570E−08 | −2.4790E−09 | 4.7790E−11 |

Table 11 and Table 12 show design data inflexion points and arrest points of the respective lenses in the camera optical lens 30 according to Embodiment 3 of the present disclosure.

TABLE 11

| | Number of inflexion points | Inflexion point position 1 | Inflexion point position 2 | Inflexion point position 3 |
|---|---|---|---|---|
| P1R1 | 1 | 2.305 | / | / |
| P1R2 | 0 | / | / | / |
| P2R1 | 1 | 0.935 | / | / |
| P2R2 | 0 | / | / | / |
| P3R1 | 3 | 0.325 | 0.775 | 1.525 |
| P3R2 | 1 | 1.485 | / | / |
| P4R1 | 0 | / | / | / |
| P4R2 | 1 | 1.685 | / | / |
| P5R1 | 2 | 0.825 | 1.825 | / |
| P5R2 | 2 | 1.575 | 1.945 | / |
| P6R1 | 1 | 1.805 | / | / |
| P6R2 | 1 | 3.565 | / | / |

TABLE 12

| | Number of arrest points | Arrest point position 1 | Arrest point position 2 |
|---|---|---|---|
| P1R1 | 0 | / | / |
| P1R2 | 0 | / | / |
| P2R1 | 1 | 1.645 | / |
| P2R2 | 0 | / | / |
| P3R1 | 2 | 0.705 | 0.825 |
| P3R2 | 0 | / | / |
| P4R1 | 0 | / | / |
| P4R2 | 0 | / | / |

TABLE 12-continued

| | Number of arrest points | Arrest point position 1 | Arrest point position 2 |
|---|---|---|---|
| P5R1 | 2 | 1.535 | 2.035 |
| P5R2 | 0 | / | / |
| P6R1 | 1 | 2.515 | / |
| P6R2 | 0 | / | / |

Figure 10:
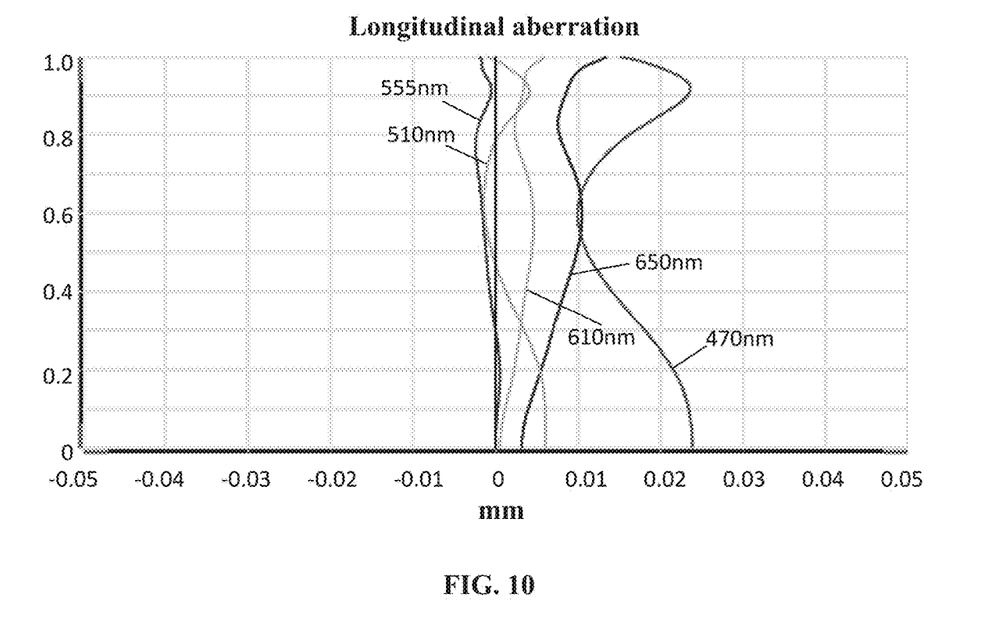
FIG. 10 shows a schematic diagram of a longitudinal aberration of the camera optical lens shown in FIG. 9.
Figure 11:
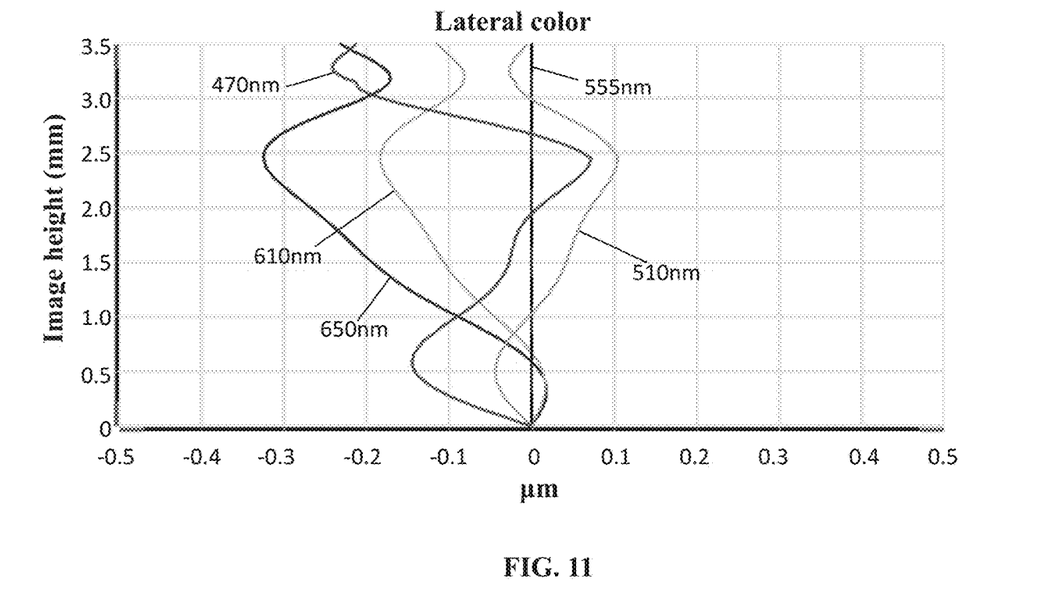
FIG. 11 shows a schematic diagram of a lateral color of the camera optical lens shown in FIG. 9.
Figure 12:
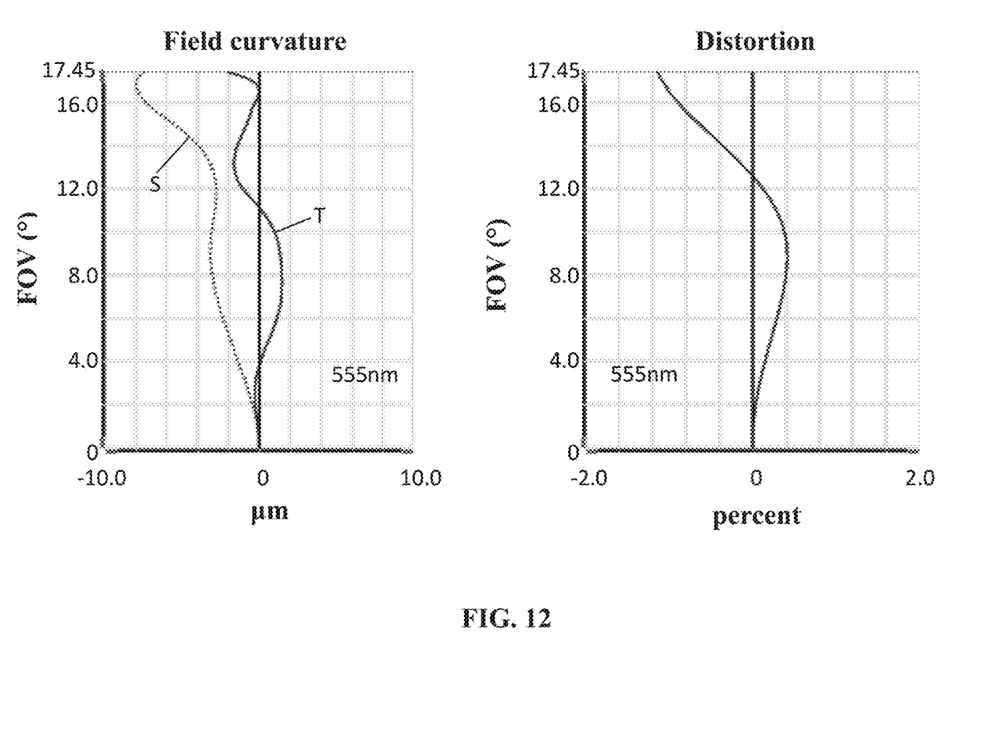
FIG. 12 shows a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm, and 470 nm after passing the camera optical lens 30 according to Embodiment 3. FIG. 12 illustrates a field curvature and a distortion of light with a wavelength of 555 nm after passing the camera optical lens 30 according to Embodiment 3. A field curvature S in FIG. 12 is a field curvature in a sagittal direction, and T is a field curvature in a tangential direction.

Table 13 in the following shows various values of Embodiment 3, and also values corresponding to parameters which are specified in the above conditions. Obviously, the camera optical lens 30 satisfies above conditions.

In the embodiment, an entrance pupil diameter (ENPD) of the camera optical lens 30 is 4.674 mm, an image height IH of 1.0H is 3.500 mm, a FOV (field of view) in the diagonal direction is 34.90°. The camera optical lens can meet the design requirements of a long focal length and is ultra-thin, and its on-axis and off-axis chromatic aberrations are fully corrected, thereby achieving excellent optical characteristics.

TABLE 13

| Parameters and conditions | Embodiment 1 | Embodiment 2 | Embodiment 3 |
|---|---|---|---|
| f1/f | 0.46 | 0.49 | 0.35 |
| R4/R3 | −3.96 | −2.05 | −29.80 |
| (R5 + R6)/(R5 − R6) | 6.42 | 29.81 | 1.52 |
| f | 10.274 | 9.509 | 11.265 |
| f1 | 4.694 | 4.659 | 3.965 |
| f2 | −6.478 | −6.290 | −6.767 |
| f3 | −32.217 | −164.996 | −8.325 |
| f4 | 15.317 | 19.279 | −157.854 |
| f5 | 32.001 | 94.896 | 17.122 |
| f6 | −8.147 | −8.813 | −23.733 |
| f12 | 9.136 | 9.254 | 6.572 |
| FNO | 2.41 | 2.45 | 2.41 |
| TTL | 9.499 | 9.417 | 10.965 |
| IH | 3.500 | 3.500 | 3.500 |
| FOV | 37.30° | 40.00° | 34.90° |

The above is only illustrates some embodiments of the present disclosure, in practice, one having ordinary skill in the art can make various modifications to these embodiments in forms and details without departing from the scope of the present disclosure.

What is claimed is:

1. A camera optical lens comprising six-piece lenses, from an object side to an image side, the six-piece lenses are:
a first lens having a positive refractive power;
a second lens having a negative refractive power;
a third lens having a negative refractive power;
a fourth lens;
a fifth lens having a positive refractive power; and
a sixth lens having a negative refractive power;
wherein the camera optical lens satisfies following conditions:

$0.35 \leq f1/f \leq 0.50;$ $-30.00 \leq R4/R3 \leq -2.00;$ $1.50 \leq (R5+R6)/(R5-R6) \leq 30.00;$ $2.06 \leq (R9+R10)/(R9-R10) \leq 8.20;$ and $0.05 \leq d9/TTL \leq 0.13,$ where
f denotes a focal length of the camera optical lens;
f1 denotes a focal length of the first lens;
R3 denotes a curvature radius of an object-side surface of the second lens;
R4 denotes a curvature radius of an image-side surface of the second lens;
R5 denotes a curvature radius of an object-side surface of the third lens;
R6 denotes a curvature radius of an image-side surface of the third lens;
R9 denotes a curvature radius of the object-side surface of the fifth lens;
R10 denotes a curvature radius of the image-side surface of the fifth lens;
d9 denotes an on-axis thickness of the fifth lens; and
TTL denotes a total optical length from an object-side surface of the first lens to an image surface of the camera optical lens along an optical axis.

2. The camera optical lens according to claim 1 further satisfying following condition:

$1.50 \leq f5/f \leq 10.00;$ where
f5 denotes a focal length of the fifth lens.

3. The camera optical lens according to claim 1, wherein an object-side surface of the first lens is convex in a paraxial region, an image-side surface of the first lens is convex in the paraxial region; and the camera optical lens further satisfies following conditions:

$-1.45 \leq (R1+R2)/(R1-R2) \leq -0.27;$ and $0.06 \leq d1/TTL \leq 0.25;$ where
R1 denotes a curvature radius of the object-side surface of the first lens;
R2 denotes a curvature radius of the image-side surface of the first lens;
d1 denotes an on-axis thickness of the first lens.

4. The camera optical lens according to claim 3 further satisfying following conditions:

$-0.91 \leq (R1+R2)/(R1-R2) \leq -0.34;$ and $0.10 \leq d1/TTL \leq 0.20.$

5. The camera optical lens according to claim 1, wherein the object-side surface of the second lens is concave in a paraxial region, the image-side surface of the second lens is concave in the paraxial region; and the camera optical lens further satisfies following conditions:

$-1.32 \leq f2/f \leq -0.40;$ $-1.87 \leq (R3+R4)/(R3-R4) \leq -0.23;$ and $0.02 \leq d3/TTL \leq 0.07;$ where
f2 denotes a focal length of the second lens;
d3 denotes an on-axis thickness of the second lens.

6. The camera optical lens according to claim 5 further satisfying following conditions:

$-0.83 \leq f2/f \leq -0.50;$ $-1.17 \leq (R3+R4)/(R3-R4) \leq -0.29;$ and $0.02 \leq d3/TTL \leq 0.06.$ 7. The camera optical lens according to claim 1, wherein the object-side surface of the third lens is convex in a paraxial region, the image-side surface of the third lens is concave in the paraxial region; and the camera optical lens further satisfies following conditions:

$-34.70 \leq f3/f \leq -0.49;$ and $0.01 \leq d5/TTL \leq 0.04;$ where
f3 denotes a focal length of the third lens;
d5 denotes an on-axis thickness of the third lens.

8. The camera optical lens according to claim 7 further satisfying following conditions:

$-21.69 \leq f3/f \leq -0.62;$ and $0.02 \leq d5/TTL \leq 0.03.$

9. The camera optical lens according to claim 1, wherein an object-side surface of the fourth lens is concave in a paraxial region, an image-side surface of the fourth lens is convex in the paraxial region; and the camera optical lens further satisfies following conditions:

$-28.03 \leq f4/f \leq 3.04$;

$-50.54 \leq (R7+R8)/(R7-R8) \leq -6.91$; and $0.01 \leq d7/TTL \leq 0.05$;

where f4 denotes a focal length of the fourth lens;

R7 denotes a curvature radius of the object-side surface of the fourth lens;

R8 denotes a curvature radius of the image-side surface of the fourth lens;

d7 denotes an on-axis thickness of the fourth lens.

10. The camera optical lens according to claim 9 further satisfying following conditions:

$-17.52 \leq f4/f \leq 2.43$;

$-31.59 \leq (R7+R8)/(R7-R8) \leq 5.53$; and $0.02 \leq d7/TTL \leq 0.04$.

11. The camera optical lens according to claim 1, wherein an object-side surface of the sixth lens is concave in a paraxial region; and the camera optical lens further satisfies following conditions:

$-4.21 \leq f6/f \leq -0.53$;

$-3.62 \leq (R11+R12)/(R11-R12) \leq -0.36$; and $0.02 \leq d11/TTL \leq 0.48$;

where f6 denotes a focal length of the sixth lens;

R11 denotes a curvature radius of the object-side surface of the sixth lens;

R12 denotes a curvature radius of an image-side surface of the sixth lens;

d11 denotes an on-axis thickness of the sixth lens.

12. The camera optical lens according to claim 11 further satisfying following conditions:

$-2.63 \leq f6/f \leq -0.66$;

$-2.26 \leq (R11+R12)/(R11-R12) \leq -0.45$; and $0.03 \leq -d11/TTL \leq 0.38$.

13. The camera optical lens according to claim 1 further satisfying following condition:

$0.29 \leq f12/f \leq 1.46$;

where f12 denotes a combined focal length of the first lens and the second lens.

14. The camera optical lens according to claim 1 further satisfying following condition:

$FNO \leq 2.52$;

where FNO denotes an F number of the camera optical lens.

15. The camera optical lens according to claim 1 further satisfying following condition:

$f/IH \geq 2.70$;

where IH denotes an image height of the camera optical lens.

16. The camera optical lens according to claim 1 further satisfying following condition:

$TTL/IH \leq 3.15$;

where IH denotes an image height of the camera optical lens.

* * * * *